United States Patent
Patel et al.

(10) Patent No.: US 10,775,838 B2
(45) Date of Patent: Sep. 15, 2020

(54) MOUNTED DISPLAYS THAT AUTOROTATE TO MATCH CONTENT ON DISPLAY

(71) Applicant: Disney Enterprises, Inc., Burbank, CA (US)

(72) Inventors: Mehul Patel, Stevenson Ranch, CA (US); Steven M. Chapman, Thousand Oaks, CA (US); Joseph Popp, Cerritos, CA (US); Matthew Deuel, Playa Vista, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 0 days.

(21) Appl. No.: 16/245,901

(22) Filed: Jan. 11, 2019

(65) Prior Publication Data

US 2020/0225696 A1    Jul. 16, 2020

(51) Int. Cl.
*G06F 1/16* (2006.01)
*G06F 16/783* (2019.01)

(52) U.S. Cl.
CPC .......... *G06F 1/1601* (2013.01); *G06F 1/1694* (2013.01); *G06F 16/783* (2019.01); *G06F 2200/1614* (2013.01); *G06F 2200/1637* (2013.01)

(58) Field of Classification Search
CPC ........ G06F 1/16; G06F 16/783; G06F 1/1694; G06F 2200/1637; G06F 2200/1614
See application file for complete search history.

(56) References Cited

U.S. PATENT DOCUMENTS

| | | | |
|---|---|---|---|
| 5,134,390 A | 7/1992 | Kishimoto et al. | |
| 7,782,342 B2 | 8/2010 | Koh | |
| 9,785,044 B2 | 10/2017 | Gocke | |
| 9,813,531 B2 | 11/2017 | Setlur et al. | |
| 9,906,783 B2 | 2/2018 | Madhani et al. | |
| 2002/0043025 A1* | 4/2002 | Zayas | E01F 9/681 49/33 |
| 2004/0239792 A1* | 12/2004 | Shibutani | G09G 5/00 348/333.12 |

(Continued)

FOREIGN PATENT DOCUMENTS

| | | |
|---|---|---|
| CN | 201311766 Y | 9/2009 |
| KR | 20060084600 A | 7/2006 |

OTHER PUBLICATIONS

FHD2400 24-inch Widescreen LCF Monitor 2007 User Guide—Gateway, <http://static.highspeedbackbone.net/pdf/Gateway_FHD2400_Manual.pdf>.

*Primary Examiner* — Rodney Amadiz
(74) *Attorney, Agent, or Firm* — Dorsey & Whitney LLP

(57) ABSTRACT

Some implementations of the disclosure are directed to automatically rotating displays to display media content based on metadata extracted from the media content that provides an indication of a target display orientation to display the media content. In one implementation, a method includes: detecting media content for display on a display, wherein the display is mounted on a rotatable display mount; extracting metadata from the detected media content, the extracted metadata providing an indication of a target display orientation to display the media content; using at least the extracted metadata, automatically causing the rotatable display mount to rotate the display to the target orientation; and displaying the media content on the rotated display.

20 Claims, 8 Drawing Sheets

(56) References Cited

U.S. PATENT DOCUMENTS

| | | | |
|---|---|---|---|
| 2008/0030045 A1* | 2/2008 | Lai | E05C 17/00 |
| | | | 296/146.1 |
| 2014/0281579 A1 | 9/2014 | Trachtenberg et al. | |
| 2015/0070340 A1* | 3/2015 | Trachtenberg | H04N 21/4122 |
| | | | 345/211 |
| 2019/0050964 A1* | 2/2019 | Jang | H04N 21/44218 |

* cited by examiner

MOUNTED DISPLAYS THAT AUTOROTATE TO MATCH CONTENT ON DISPLAY

SUMMARY

Some implementations of the disclosure are directed to automatically rotating displays to display media content based on metadata extracted from the media content that provides an indication of a target display orientation to display the media content.

In one embodiment, a method includes: detecting media content for display on a display, where the display is mounted on a rotatable display mount; extracting metadata from the detected media content, the extracted metadata providing an indication of a target display orientation to display the media content; using at least the extracted metadata, automatically causing the rotatable display mount to rotate the display to the target orientation; and displaying the media content on the rotated display. The extracted metadata may include an aspect ratio or resolution of the detected media content that is used to determine the target orientation. The detected media content may include video received over a network such as a content delivery network, or video content retrieved from a storage.

In some implementations, during rotation of the rotatable display mount, at least a sensor is used to determine if there is an obstruction to rotation of the rotatable display mount to the target orientation. In implementations where it is determined that there is an obstruction to rotation of the rotatable display mount to the target orientation; the method further includes: in response to determining that there is an obstruction, presenting an audible or visual alert.

In some implementations, the method further includes: detecting a second media content for display on the display; extracting second metadata from the detected second media content, the extracted second metadata providing an indication of a second target display orientation to display the second media content; using at least the extracted second metadata, automatically causing the rotatable display mount to begin rotating the display to the second target orientation; during rotation of the rotatable display mount to the second target orientation, using at least a sensor to detect an obstruction to rotation; and in response to detecting the obstruction, causing the display to display a third media content different from the second media content. In some implementations, the display displays the third media content only if the obstruction is detected for a predetermined amount of time.

In some implementations, the method further includes: using at least the extracted metadata, automatically causing a second rotatable display mount to rotate a second display to the target orientation, where the second display is mounted on the second rotatable display mount. In some implementations, the method further includes: displaying the media content on the second rotated display, where the media content is synchronously displayed on the rotated display and the second rotated display.

In some implementations, the rotatable display mount is configured to receive the extracted metadata and determine the target orientation.

In some embodiments, some or all of the aforementioned operations may be implemented by executing instructions stored on a non-transitory computer-readable medium. For example, in one embodiment, a non-transitory computer-readable medium has executable instructions stored thereon that, when executed by a processor, cause a system to perform operations of: detecting media content for display on a display, wherein the display is mounted on a rotatable display mount; extracting metadata from the detected media content, the extracted metadata providing an indication of a target display orientation to display the media content; using at least the extracted metadata, automatically causing the rotatable display mount to rotate the display to the target orientation; and displaying the media content on the rotated display.

In one embodiment, a system includes: a rotatable display mount; a processor; and a non-transitory computer-readable medium having executable instructions stored thereon that, when executed by the processor, cause the processor to perform operations of: detecting media content for display on a display, where the display is mounted on the rotatable display mount; extracting metadata from the detected media content, the extracted metadata providing an indication of a target display orientation to display the media content; using at least the extracted metadata, automatically causing the rotatable display mount to rotate the display to the target orientation; and displaying the media content on the rotated display.

Other features and aspects of the disclosed technology will become apparent from the following detailed description, taken in conjunction with the accompanying drawings, which illustrate, by way of example, the features in accordance with implementations of the disclosed technology. The summary is not intended to limit the scope of any inventions described herein, which are defined by the claims and equivalents.

It should be appreciated that all combinations of the foregoing concepts (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments of the disclosure.

The figures are not exhaustive and do not limit the present disclosure to the precise form disclosed.

DETAILED DESCRIPTION

With the proliferation of various forms of media content (e.g., images or video) that may be captured by a variety of different devices (e.g., smartphones, tablets, head mounted cameras, etc.), there is an increased variety of media content having a variety of different aspect ratios (e.g., 1:85:1, 16:9, 4:3, 4:5, 3:4, 9:16, etc.). Particularly, there is an increasing amount of media content that is most suited for display on a display in a non-horizontal (e.g., vertical) orientation. For example, many videos and images captured by smartphones are captured in a vertical orientation or portrait mode. Although such media may be displayed on a display in a default horizontal orientation, in order to display such media in its original aspect ratio on the horizontally oriented display, it is necessary to add large black bars to the sides of the displayed media. These large black bars may encompass a majority of the display area, providing a suboptimal viewing experience. Although some display systems (e.g., computer monitors or handheld mobile device displays) exist for manually rotating the display to display the media content with the display in a more desirable orientation, such systems may not scale well when applied to larger displays, and they may be particularly cumbersome in the case of large displays (e.g., televisions) that are mounted to a wall or on a large stand.

Further, as theaters and other enterprises begin to replace vertical (or horizontal) paper posters (e.g., posters advertising new movies) with digital screens, it may be advantageous to configure those digital screens to be automatically rotatable to match displayed content. For example, although screens in a theater may be placed in a vertical orientation (e.g., 90 degrees) to mimic a movie poster aspect ratio, it may be advantageous if the screens could be configured to display other content (e.g., movie trailer) in other orientations (e.g., horizontal) to match the content's aspect ratio to eliminate or minimize adjusting and cropping the content to fit the dimensions of the display.

To this end, various implementations of the disclosure are directed to automatically rotating displays to display media content based on metadata extracted from the media content that provides an indication of a target display orientation to display the media content.

Figure 1A:
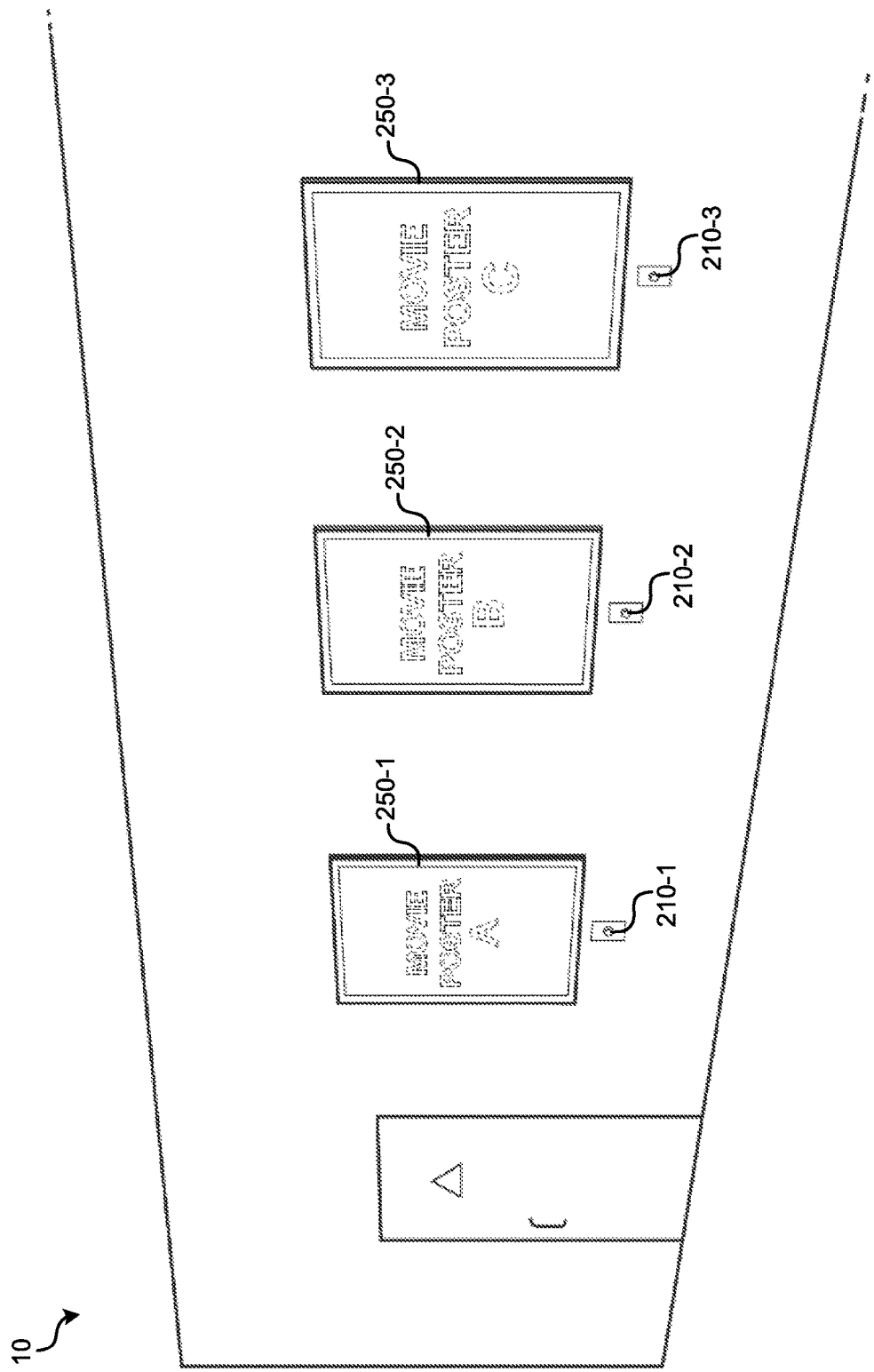
FIG. 1A illustrates an example theater environment in which embodiments of the disclosure may be implemented.
Figure 1B:
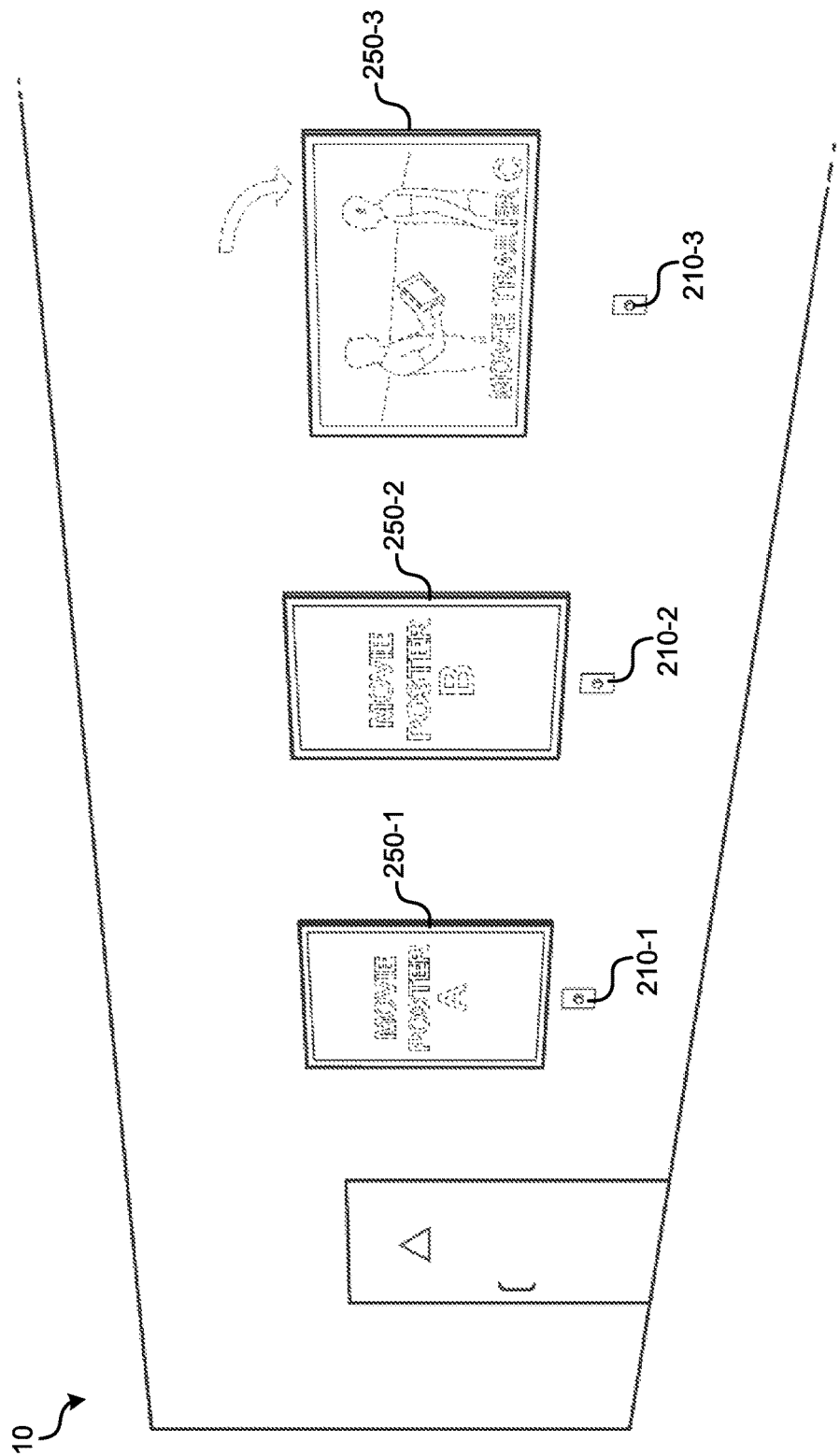
FIG. 1B illustrates the example theater environment of FIG. 1A, after rotating one of the displays.

FIGS. 1A-1B illustrate an example movie theater environment 10 in which embodiments of the disclosure may be implemented. As illustrated in this example environment, electronic displays 250-1, 250-2, and 250-3 (individually referred to as a "display 250") may display, in a vertical orientation, a movie poster media content (e.g., an image file) or some other type of vertically oriented advertisement of a movie. Additionally, as illustrated in the example of FIG. 1B, a display (e.g., display 250-3) may be rotated to a horizontal orientation to display movie trailer content (e.g., video file) corresponding to the same movie shown in the digital poster or to a different movie.

Each display 250 may be a component of or in communication with a display system (e.g., a display system 200 as further described below with reference to FIG. 2) that obtains media content, causes the display to be correctly oriented to display the media content in a preferred orientation, and/or sends a signal to the display to display the media content. As shown by FIGS. 1A-1B, when a display displays a vertical poster, the display 250 may be oriented in a vertical orientation. Alternatively, when a display displays a movie trailer having a widescreen format or some other format suited for horizontal presentation, a display 250 may be oriented in a horizontal orientation.

In the example environment of FIGS. 1A-1B, each display 250 is coupled to a display mount (not shown) that is automatically rotated depending on the media content that is displayed on display 250. In particular, as further described below, the display mount may be automatically rotated using at least metadata (e.g., aspect ratio or image/video resolution) extracted from the media content that is to be displayed. In this particular example, each display 250-1, 250-2, and 250-3 is associated with a respective control 210-1, 210-2, and 210-3 (individually referred to as a "control 210") that may be used to trigger display of a new media content file and, depending on the metadata extracted from the media content file, rotation of the corresponding display 250. For example, a control 250 may be implemented as a button that is pressed by a customer of the movie theater to switch between viewing poster art and trailers of a movie. In other implementations, no control 210 may be provided. For example, display of new media content may instead be controlled by the operator of the theater (e.g., in accordance with an agreement with one or more studios).

In example environment 10, a display mount may mount a display 250 to a wall in a movie theater, such as in a hallway that advertises upcoming or recently released movies. However, it should be appreciated that the display mount in other implementations may be implemented as a stand or some other type of display mount. Moreover, it should be noted that embodiments of the disclosure are not limited to the movie theater context. Rather, as will be appreciated from the disclosure, the technology described herein may be implemented in a home environment (e.g., with personal television sets), another business environment, an outdoor environment (e.g., outdoor displays), or any other environment where it would be beneficial to automatically rotate displays to display media content based on a preferred orientation for showing the media content.

Figure 2:
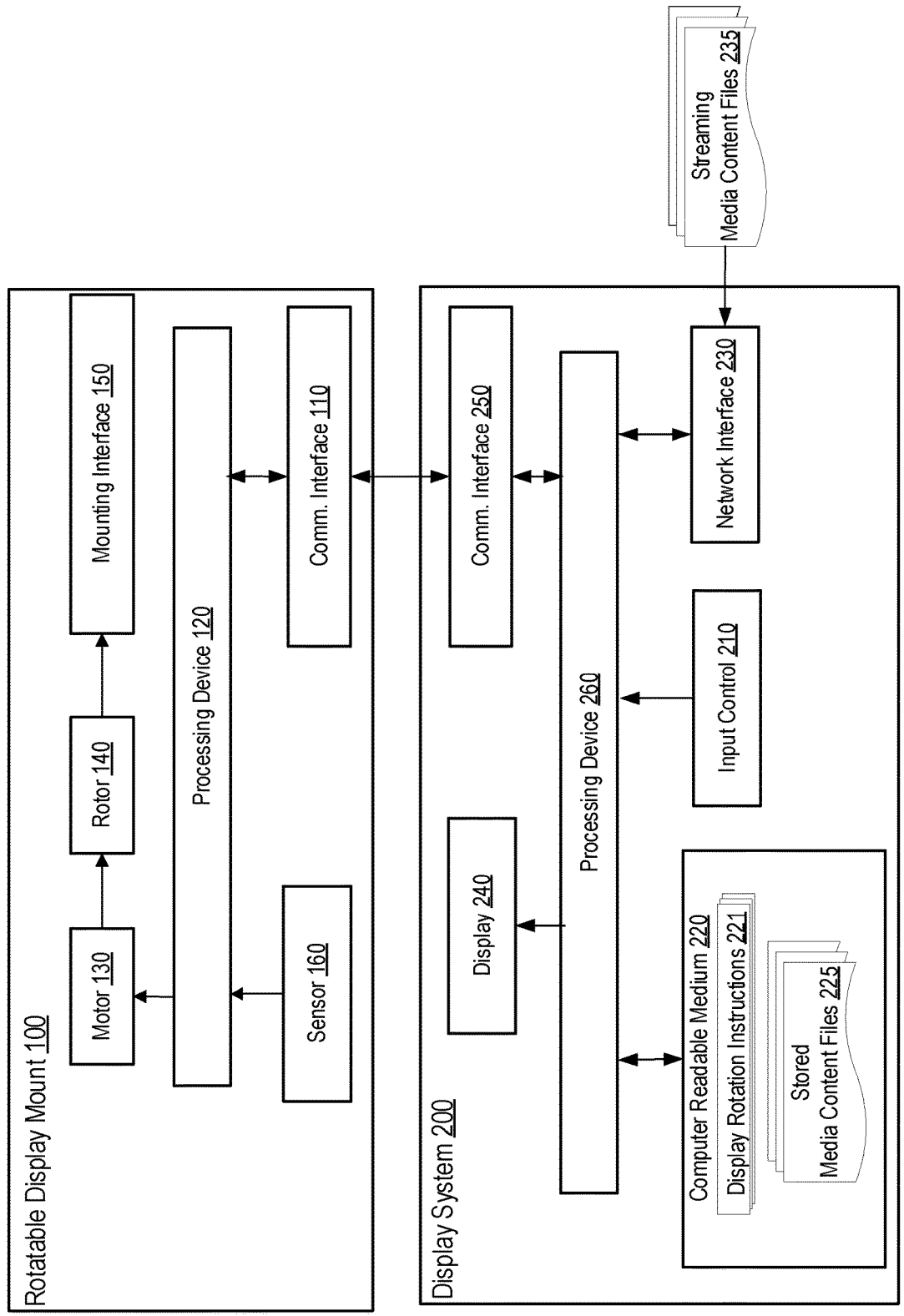
FIG. 2 is a block diagram illustrating an example architecture of components of a display system and rotatable display mount, in accordance with implementations of the disclosure.

FIG. 2 is a block diagram illustrating an example architecture of components of a display system 200 and rotatable display mount 100, in accordance with implementations of the disclosure. Display system may correspond to a theater display system as described above with reference to FIGS. 1A-1B, a television set such as a smart television, a server/computer coupled to a display, or any other display system 200 that may be configured to communicate with a rotatable display mount 100 coupled to a display 250 to automatically rotate the mount 100 based on metadata extracted from presented media content.

Display system 200 may include an input control 210, computer readable medium 220, network interface 230, display 240, communication interface 250, and processing device 260.

Input control 210 may include buttons, knobs, dials, touch controls, levers, voice controls, or any other control that may be physically actuated using tactile or vocal feedback to select a new media content file to be presented. For example, an input control 210 may be actuated to present a stored media content file 225 or streaming media content file 235. It should be noted that some embodiments described herein may be implemented without the use of a specific control 210 to select a media content file for display.

Computer readable medium 220 may store media content files 225 that are displayed by a display 250. For example, computer readable medium 220 may store images (e.g., film posters, user-captured photographs, photographs retrieved over the Internet, or other photographs) or video (e.g., trailers, films, television episodes, user-captured videos, or other video) that is presented on a display 250. The stored media content files 225 may also include audio and/or subtitle data that is presented synchronously (e.g., using speakers) with the displayed content. As alluded to above, a media content file (e.g., stored media content file 225) may include metadata that provides an indication or a target display orientation (e.g., horizontal or vertical) to display the media content. For example, the metadata may include an aspect ratio of the displayed content, a resolution of the displayed content, or some other metadata.

Computer readable medium 220 may also store display rotation instructions 221, that when executed by a processing device 260, may i) cause display system 200 to extract metadata from a media content file (e.g., stored media content file 225 or streaming media content file 235) to determine a target display orientation to display the media content; and ii) cause rotatable display mount 100 to rotate the display to the target orientation. Alternatively, such instructions may be stored on a computer readable medium (not shown) of rotatable display mount 100, and executed by a processing device 120.

Network interface 230 may be configured to receive streaming media content files 235 (e.g., video or image) over a wired or wireless communication network. For example, media content files 235 may be streamed over a local area network (LAN) or from the Internet. Network interface 235 may be implemented as a network interface controller, a cellular transceiver, or some other suitable network interface for receiving streamed media content files 235.

Display 240 may be any display panel (e.g., OLED, QLED, LED, LCD, etc.) such as a monitor or television that may be mounted on a rotatable display mount 100. In some implementations, the various components of display system 200 may be integrated into the display panel (e.g., as a smart television). In some implementations, some components of rotatable display mount 100 may be integrated into display 240.

Communication interface 250 (and corresponding communication interface 110 of mount 100) may include a physical wired communications interface (e.g., USB type-C, USB 3.0, thunderbolt, powerline communications, etc.) for communicating control signals that cause rotatable display mount 100 to rotate to a desired orientation based on metadata extracted from media content. In some implementations, communication interface 250 may communicate the extracted metadata, and rotatable display mount 100 may determine to what orientation to rotate to using the received metadata. In other implementations, communication interface 250 may communicate a signal that causes rotatable display mount to rotate to a specified orientation. In alternative implementations, communication interface 250 may provide a wireless connection such as an ad-hoc radio frequency connection to rotatable display mount 100.

Rotatable display mount 100 may be any rotatable mount that may be mechanically coupled to a display 240. It may be implemented as a wall mount or a standing mount. In some implementations, it may be designed in compliance with the VESA Mounting Interface Standard. It may include a communication interface 110, processing device 120, a motor/motor driver 130, a rotor 140, a mounting interface 150 to mechanically couple mount 100 to display 240, and sensor 160.

Processing device 120 may process control signals received from display system 250 (e.g., via communication interface 110) to rotate mounting interface 150 to a desired orientation. For example, under operation of a processing device 120 (e.g., a controller), a signal may be sent to a motor/motor driver 130 that powers a rotor 140 that causes mounting interface 150 to rotate. For instance, a rotatable arm of mounting interface 150 may rotate, thereby rotating display 240.

In implementations where extracted metadata is communicated to rotatable display mount 100, processing device 120 may itself determine to what orientation to rotate mount 100. In some implementations, rotatable display mount 100 may not include any processing device 120. In such implementations, all processing of signals may be done by display system 200. For example, display system 200 may transmit control signals directly to motor 130.

In some implementations, a sensor 160 may be included in rotatable display mount 100 to detect people or objects (e.g., adjacent display) that are obstructing or will obstruct rotation of rotatable mount 100. Sensor 160 may be implemented as one or more position sensors (e.g., accelerometers, gyroscopes, magnetometers, etc.), optical sensors, or other sensors that may be configured to generate signals providing an indication that rotation of mount 100 has been or will be obstructed. Signals generated by these sensors may be processed by processing device 120. In some implementations, rotatable display mount 100 may cease rotation or rotate back to its initial orientation if an obstruction is detected for more than a predetermined amount of time. In some implementations, rotatable display mount 100 may communicate with display system 200 (e.g., via communication interface 110) when an obstruction is detected. In this manner, an operator of display system 200 (e.g., theater) may be notified when rotation of the display is obstructed.

In some implementations, rotatable display mount 100 may be powered by display system 200 (e.g., via power line communications over communication interface 110). In other implementations, rotatable display mount may be powered by a separate power source (e.g., wall outlet).

Figure 3:
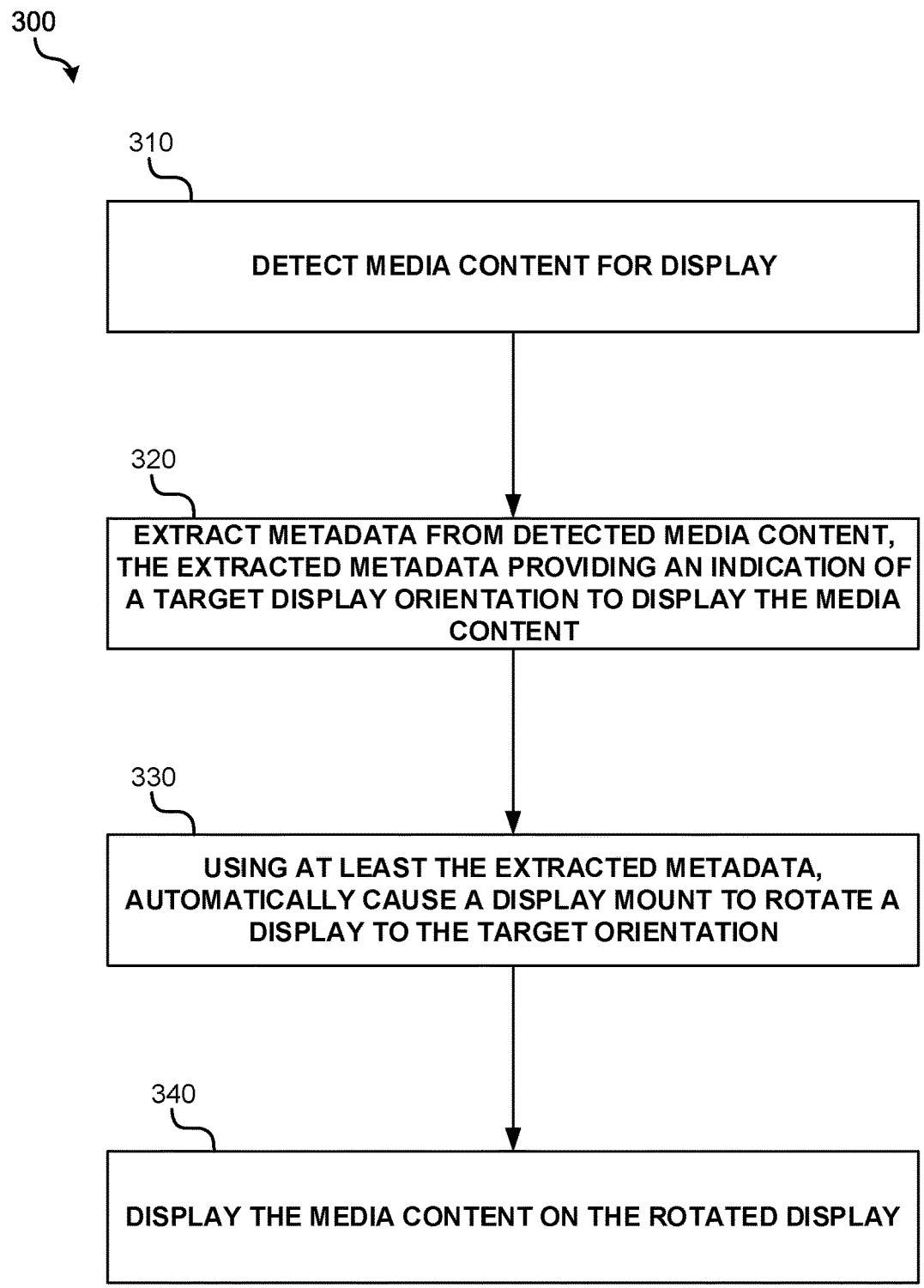
FIG. 3 is an operational flow diagram illustrating an example method for automatically rotating a display to display media content based on metadata extracted from the media content, in accordance with implementations of the disclosure.

FIG. 3 is an operational flow diagram illustrating an example method 300 for automatically rotating a display 250 to display media content based on metadata extracted from the media content, in accordance with implementations of the disclosure.

At operation 310, media content is detected for display. The detected media content may include a stored media content file 225 that is read from computer readable medium 220 or a streaming media content file 235 that is streamed over a network. As such, as new media content is received for playback (either automatically or in response to user input), it may be detected for display. By way of example, in the theater environment the detected media content file may be a digital poster or movie trailer that is selected by a theater operator for display. In the home environment, the detected media content file may be content that is streamed over a content delivery network (e.g., using a video streaming application), content that is received using a cable or satellite TV subscription, personal content of the user that is retrieved from a storage and/or over a network (e.g., videos or photos captured by a user's mobile device), etc. In some implementations, the media content is detected for display after it is selected by a user (e.g., for playback) using an input control 210.

At operation 320, metadata is extracted from the detected media content, the extracted metadata providing an indication of a target display orientation to display the detected media content. In various implementations, the extracted metadata may include an aspect ratio of the displayed content, a resolution of the displayed content, or some other metadata that provides an indication of a target display orientation to display the detected media content.

At operation 330, using at least the extracted metadata, a rotatable display mount 100 is automatically caused to rotate a display to the target orientation. For example, a display system 200 may signal rotatable display mount 100 to rotate from a vertical orientation to a horizontal orientation (or vice versa) based on the aspect ratio of the detected media content. In response, a motor 130 of rotatable display mount 100 may cause a rotor 140 to rotate a mounting interface 150 of the display to the target orientation. In some implementations, the rotatable display mount 100 may receive the aspect ratio data or other metadata and decide, based on the metadata, what the target orientation should be. In some implementations, the amount of rotation may be determined using at least the extracted metadata and a current orientation of the display/display mount.

Although implementations thus far have been described in the context of rotatable display mounts 100 that rotate a display 240 to a horizontal or vertical orientation, it should be appreciated that in some implementations other target orientations may be selected. For example, using a horizontal orientation as a starting point, a rotatable display mount 100 may rotate clockwise or counter clockwise 10 degrees, 20 degrees, 30 degrees, 45 degrees, 60 degrees, 90 degrees (vertical orientation), etc. In some implementations, the number of positions that a rotatable display mount 100 may rotate to may be limited to a predetermined number (e.g., just a vertical and horizontal orientation).

In some implementations, operation 330 may be skipped if the target orientation, as determined by the extracted metadata, is the same as the current orientation of the display 240. For example, if the detected media content is a video captured in portrait mode by a smartphone, and the display is currently oriented in a vertical orientation, there may be no need to rotate the display.

In implementations where rotatable display mount 100 includes a sensor 160 that detects an obstruction during rotation, rotatable display mount 100 may temporarily pause rotation until the obstruction is removed. In some implementations, mount 100 may rotate back to its initial orientation if an obstruction is detected for more than a predetermined amount of time. In such implementations, the detected media content may be displayed in the suboptimal orientation or the display of the media content may be canceled (e.g., operation 340 skipped). In some implementations, when an obstruction is detected, display system 200 may audibly or visually alert a user of the obstruction. For example, an audible alert may be emitted by a speaker (e.g., a speaker of display system 200) in response to detecting an obstruction.

At operation 340, the media content is displayed on the rotated display. If the media content includes audio, the audio may also be played synchronously with the display of the content. In some implementations, the media content is not displayed on the display until it is fully rotated to the target orientation. In such implementations, the rotatable display mount 100 may communicate a signal to display system 200 signaling the completion of rotation before media content display is initiated. In some implementations, the media content is displayed on the display after a predetermined amount of time passes from it being detected.

As noted above, in some implementations the rotatable display mount 100 may include a sensor 160 that detects obstructions to rotation. In response to detecting the obstruction, a user may be alerted. In some environments, it may be desirable to use the obstruction to promote other media content. For example, customers may be encouraged in a theater environment to prevent rotation of a display to trigger playback of an alternative media file that promotes a particular film or franchise.

Figure 4:
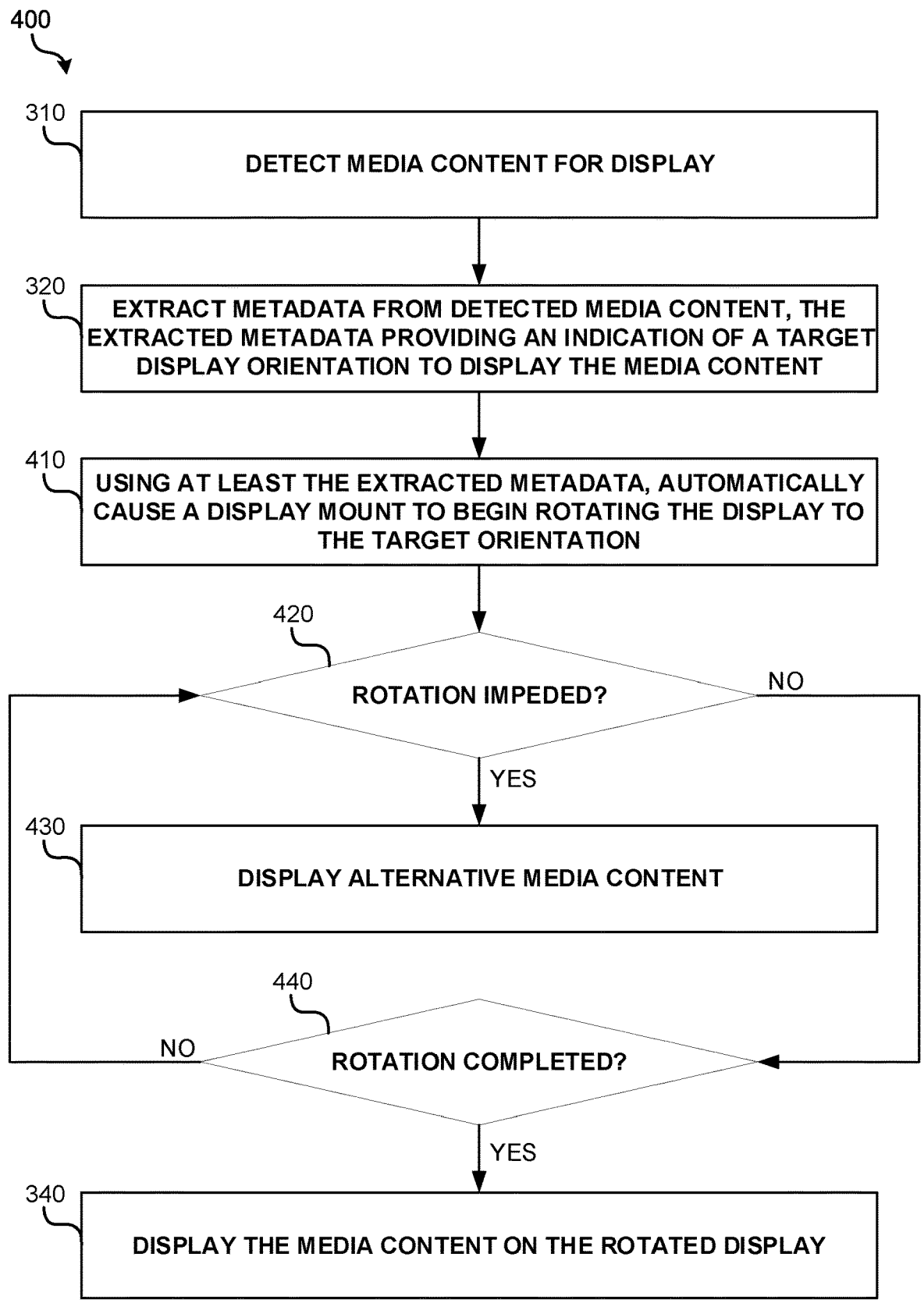
FIG. 4 is an operational flow diagram illustrating an example method for automatically rotating a display to display media content based on metadata extracted from the media content, and presenting alternative media content if it is detected that rotation of the display is impeded, in accordance with implementations of the disclosure.

To this end, FIG. 4 is an operational flow diagram illustrating an example method 400 for automatically rotating a display to display media content based on metadata extracted from the media content, and presenting alternative media content if it is detected that rotation of the display is impeded, in accordance with implementations of the disclosure. Operations 310, 320, and 340 of method 400 may be performed in a manner similar to that discussed above with reference to method 300.

Following extraction of metadata at operation 320, at operation 410, using at least the extracted metadata, a display mount may be caused to automatically begin rotation of the display to the target rotation. At decision 420, a sensor 160 of rotatable display mount 100 may be used to detect if rotation is being impeded. If so, at operation 430, alternative media content, different from the detected media content, may be displayed on the display 250. In some implementations, the alternative media content is displayed only if an obstruction is detected for at least a predetermined amount of time.

In some implementations, display system 200 may store one or more alternative media content files in computer readable medium 220 that may be displayed in the event that an obstruction is detected. A unique alternative media content file may be used depending on the detected media content file that was originally intended to display. Considering the example of the movie theater environment, a prompt or character may be displayed that scolds or mocks customers for obstructing rotation of displays.

Alternatively, if no obstruction is detected at decision 420, at decision 440 it may be determined if rotation to the target orientation has completed. If so, method 400 may proceed to operation 340. It should be appreciated that decisions 420 and 440 may iterate during rotation of the display.

Figure 5:
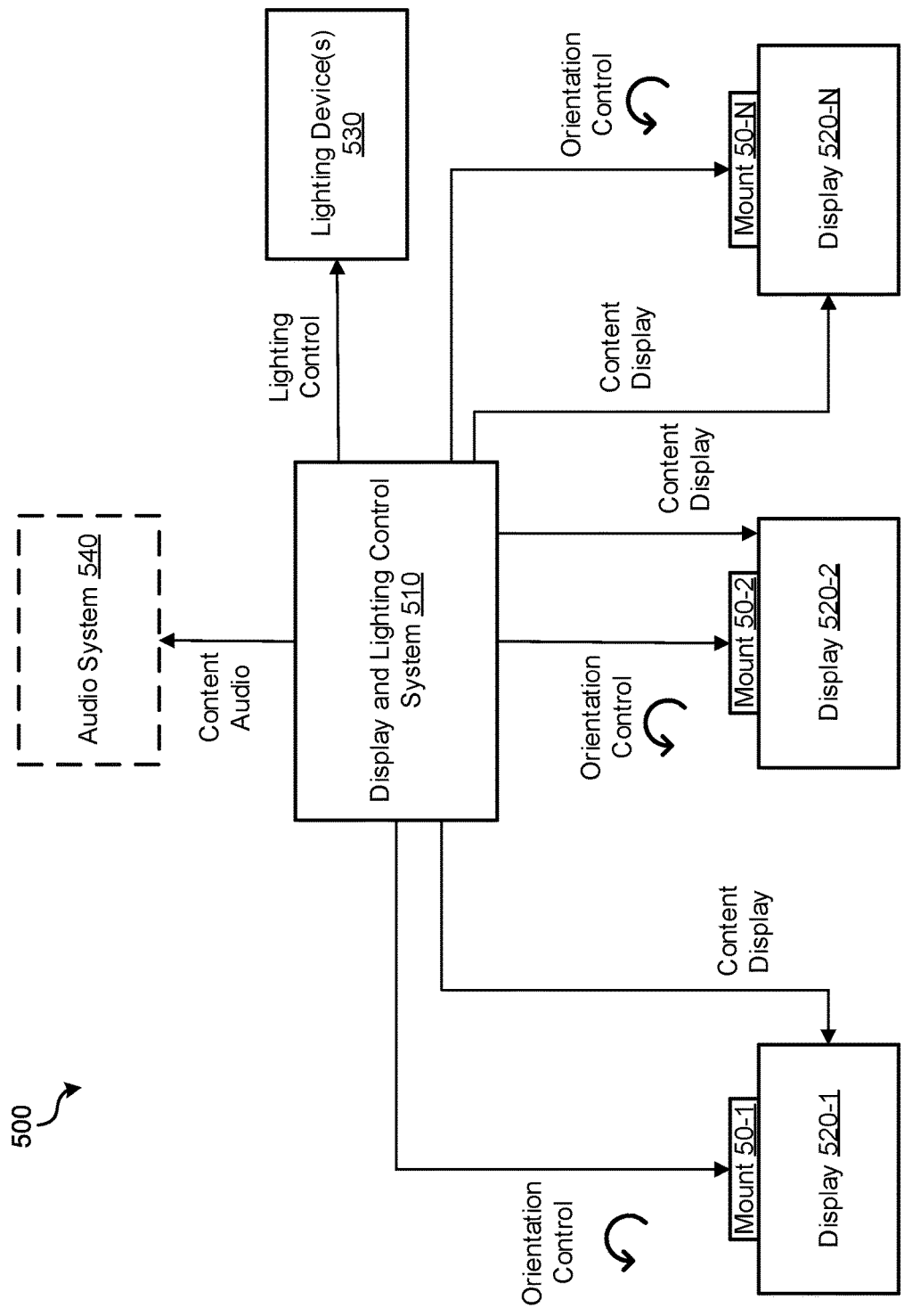
FIG. 5 is a block diagram illustrating an example architecture of a system that may cause multiple displays to be automatically rotated to synchronously display media content based on metadata extracted from the media content, in accordance with implementations of the disclosure.

Although implementations thus far have been described in the context of a display system rotating a single display using a single rotatable display mount, in some implementations it may be advantageous to cause multiple displays to automatically rotate to synchronously display the same media content. For instance, in the movie theater environment 10 of FIGS. 1A-1B, it may be advantageous to have all three displays 250 rotate to a horizontal orientation to display the same trailer. Additionally, it may be advantageous to concurrently control other devices (e.g., lighting devices and speaker system) depending on the media content that is being presented. FIG. 5 is a block diagram illustrating an example architecture of a system 500 that may implement these features.

In system 500, display and lighting control system 510 may be configured to control the display of content on N displays, namely displays 520-1, 520-2, . . . , 520-N (individually referred to as a "display 520"). Additionally system 510 may be configured to control the orientation of N rotatable mounts corresponding to the N displays, namely mounts 50-1, 50-2, . . . , 50-N (individually referred to as a "mount 50"). As such, in cases of synchronized display of the same media content, display and lighting control system 510 may first cause each of the displays 520 to rotate to a target orientation (if it is not already in the target orientation) using metadata extracted from the media content. Thereafter, it may synchronously transmit the same media content to each display 520 for display.

Display and lighting control system 510 may also be configured to control one or more lighting devices 530. For example, displaying and lighting control 510 may include a DMX controller that uses an electrical signal data protocol to control LEDs and other light fixtures during playback of content. Display and lighting control system 510 may also be configured to control an audio system 540. For example, the audio system 540 may include one or more speakers for emitting sound corresponding to audio of media content that is synchronously displayed on each display 520.

Figure 6:
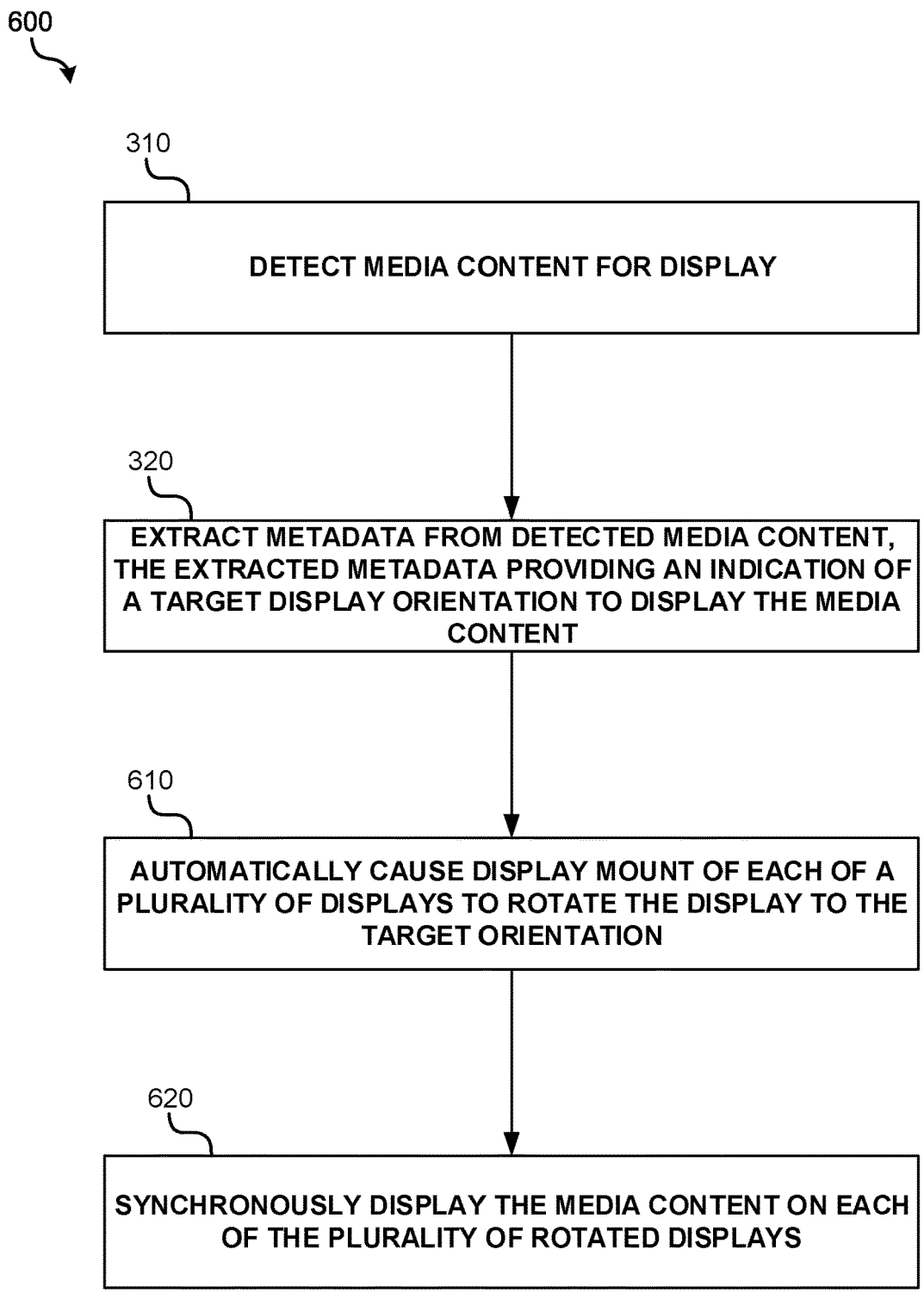
FIG. 6 is an operational flow diagram illustrating an example method for automatically rotating multiple displays to synchronously display media content based on metadata extracted from the media content, in accordance with implementations of the disclosure.

FIG. 6 is an operational flow diagram illustrating an example method 600 for automatically rotating multiple displays to synchronously display media content based on metadata extracted from the media content, in accordance with implementations of the disclosure. Operations 310 and 320 of method 600 may be performed in a manner similar to that discussed above with reference to method 300. At operation 630, a display control system may automatically cause a display mount of each of the plurality of displays to rotate the display to the target orientation. In some implementations, each of the displays may initially be arranged in different configurations (e.g., some vertical, some horizontal). As such, in some implementations, only a subset of the displays may be rotated during operation 630. At operation 640, the media content is synchronously displayed on each of the plurality of rotated displays.

Figure 7:
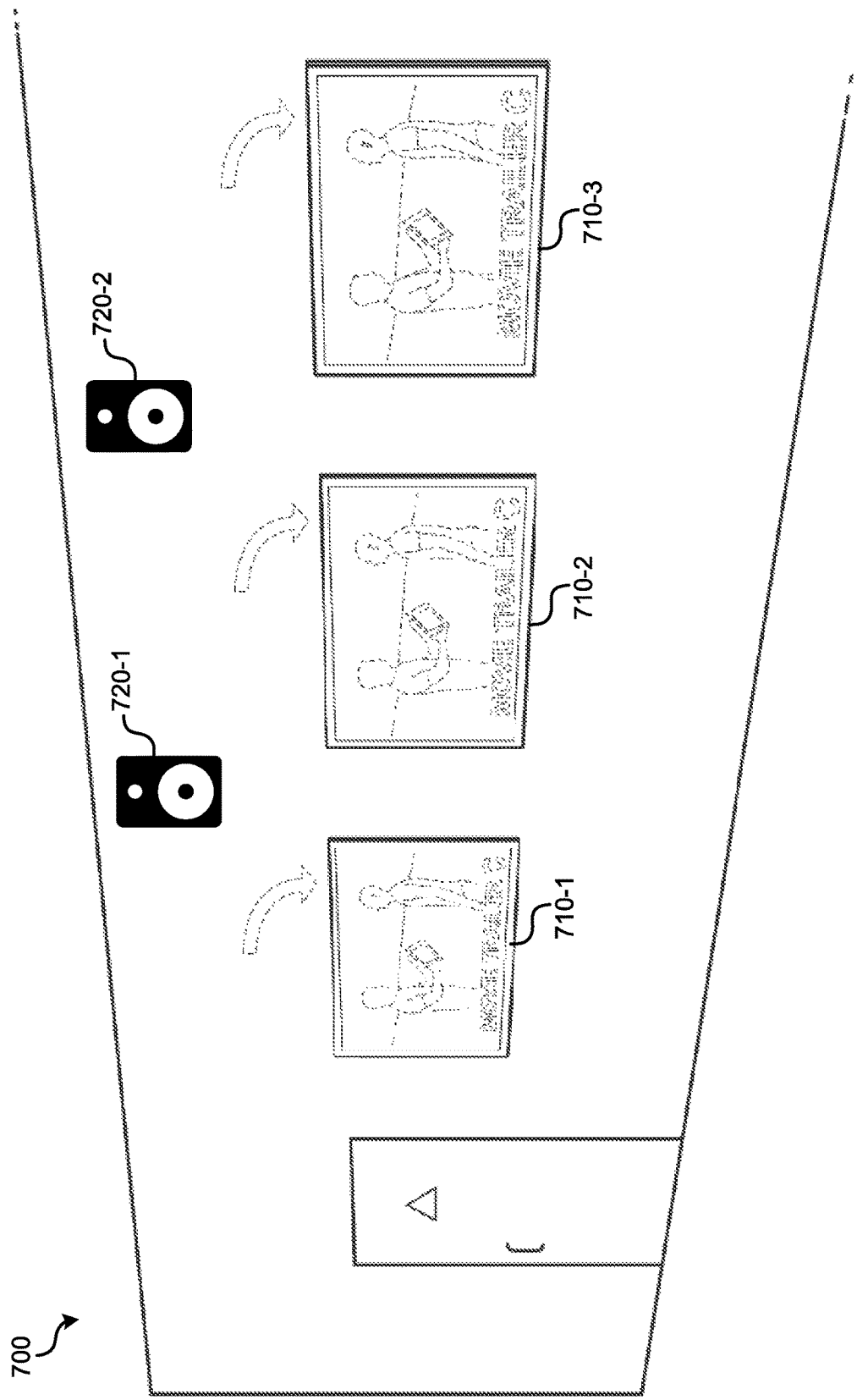
FIG. 7 illustrates another example theater environment in which embodiments of the disclosure may be implemented.

FIG. 7 illustrates another example theater environment 700 in which embodiments of the disclosure may be implemented. In example environment 700, displays 710-1, 710-2, and 710-3 may be caused to rotate to a target orientation (e.g., horizontal) and synchronously display the same media content (e.g., movie trailer). During display of the media content, speakers 720-1 and 720-2 may emit audio corresponding to the media content.

In this document, the terms "machine readable medium," "computer readable medium," and similar terms are used to generally refer to non-transitory mediums, volatile or non-volatile, that store data and/or instructions that cause a machine to operate in a specific fashion. Common forms of machine readable media include, for example, a hard disk, solid state drive, magnetic tape, or any other magnetic data storage medium, an optical disc or any other optical data storage medium, any physical medium with patterns of holes, a RAM, a PROM, EPROM, a FLASH-EPROM, NVRAM, any other memory chip or cartridge, and networked versions of the same.

These and other various forms of computer readable media may be involved in carrying one or more sequences of one or more instructions to a processing device for execution. Such instructions embodied on the medium, are generally referred to as "instructions" or "code." Instructions may be grouped in the form of computer programs or other groupings. When executed, such instructions may enable a processing device to perform features or functions of the present application as discussed herein.

In this document, a "processing device" may be implemented as a single processor that performs processing operations or a combination of specialized and/or general-purpose processors that perform processing operations. A processing device may include a CPU, GPU, APU, DSP, FPGA, ASIC, SOC, and/or other processing circuitry.

The various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. Additionally, unless the context dictates otherwise, the methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method, comprising:
    detecting content for display on a display, wherein the display is mounted on a rotatable display mount;
    extracting metadata from the content, the metadata providing an indication of a target display orientation;

rotating the rotatable display mount to rotate the display toward the target display orientation based on the metadata;

displaying the content on the rotated display; and responsive to detecting an obstruction to rotation of the rotatable display mount to the target display orientation, displaying a second content on the display, wherein the second content is different than the content.

2. The method of claim 1, wherein the metadata includes an aspect ratio or resolution of the content, wherein the aspect ratio or the resolution is used to determine the target display orientation.

3. The method of claim 1, further comprising during the rotation of the rotatable display mount, using a sensor to determine a presence of the obstruction.

4. The method of claim 3, wherein the second content includes an audible alert or a visual alert.

5. The method of claim 1, further comprising:

detecting a third content for display on the display, extracting an additional metadata from the third content, the additional metadata providing an indication of a second target display orientation to display the third content; and rotating the rotatable display mount to rotate the display toward the second target display orientation based on the additional metadata.

6. The method of claim 1, wherein the display displays the second content when the obstruction is detected for a predetermined amount of time.

7. The method of claim 1, further comprising rotating a second rotatable display mount to rotate a second display toward the target display orientation based on the metadata, wherein the second display is mounted on the second rotatable display mount.

8. The method of claim 7, further comprising displaying the content on the rotated second display, wherein the content is synchronously displayed on the rotated display and the rotated second display.

9. The method of claim 1, wherein the rotatable display mount is configured to receive the metadata and determine the target display orientation.

10. The method of claim 1, wherein the content includes video.

11. A non-transitory computer-readable medium having executable instructions stored thereon that, when executed by a processor, cause a system to perform operations of:

detecting content for display on a display, wherein the display is mounted on a rotatable display mount;

extracting metadata from the content, the metadata providing an indication of a target display orientation;

rotating the rotatable display mount to rotate the display toward the target display orientation based on the metadata;

displaying the content on the rotated display; and responsive to detecting an obstruction to rotation of the rotatable display mount to the target display orientation, displaying a second content on the display, wherein the second content is different than the content.

12. The non-transitory computer-readable medium of claim 11, wherein the metadata includes an aspect ratio or resolution of the content, wherein the aspect ratio or the resolution is used to determine the target display orientation.

13. The non-transitory computer-readable medium of claim 11, wherein the instructions, when executed by the processor, further cause the system to perform an operation of during the rotation of the rotatable display mount, using a sensor to determine a presence of the obstruction.

14. The non-transitory computer-readable medium of claim 11, wherein the second content includes an audible alert or a visual alert.

15. The non-transitory computer-readable medium of claim 11, wherein the instructions, when executed by the processor, further cause the system to perform operations of:

detecting a third content for display on the display, extracting an additional metadata from the third content, the additional metadata providing an indication of a second target display orientation to display the third content; and rotating the rotatable display mount to rotate the display toward the second target display orientation based on the additional metadata.

16. The non-transitory computer-readable medium of claim 11, wherein the display displays the second content when the obstruction is detected for a predetermined amount of time.

17. The non-transitory computer-readable medium of claim 11, wherein the instructions, when executed by the processor, cause the system to rotate a second rotatable display mount to rotate a second display toward the target display orientation based on the metadata, wherein the second display is mounted on the second rotatable display mount.

18. The non-transitory computer-readable medium of claim 17, wherein the instructions, when executed by the processor, further cause the system to perform an operation of displaying the content on the rotated second display, wherein the content is synchronously displayed on the rotated display and the rotated second display.

19. The non-transitory computer-readable medium of claim 11, wherein the rotatable display mount is configured to receive the metadata and determine the target display orientation.

20. A system, comprising:

a rotatable display mount;

a processor; and a non-transitory computer-readable medium having executable instructions stored thereon that, when executed by the processor, cause the processor to perform operations of:

detecting content for display on a display, wherein the display is mounted on the rotatable display mount;

extracting metadata from the content, the metadata providing an indication of a target display orientation;

rotating the rotatable display mount to rotate the display toward the target display orientation based on the metadata;

displaying the content on the rotated display; and responsive to detecting an obstruction to rotation of the rotatable display mount to the target display orientation, displaying a second content on the display, wherein the second content is different than the content.

* * * * *